ALBERT G. MUMMA
INVENTOR.

BY Daniel H. Bobis
Atty

Feb. 10, 1970  A. G. MUMMA  3,494,589
ROTARY VALVE WITH INCREASED FLOW AREA
Filed July 31, 1968  2 Sheets-Sheet 2
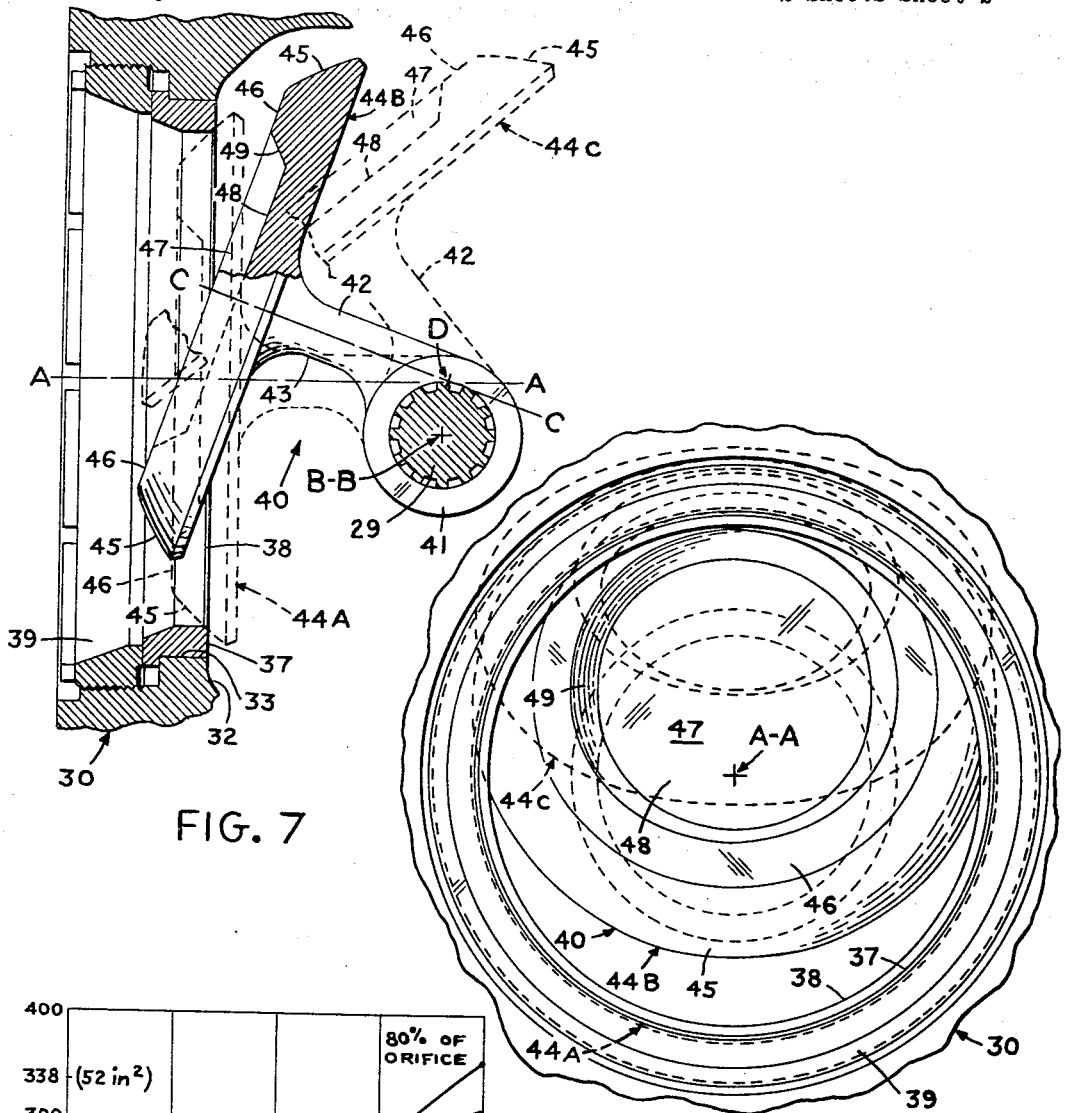
FIG. 7
FIG. 8
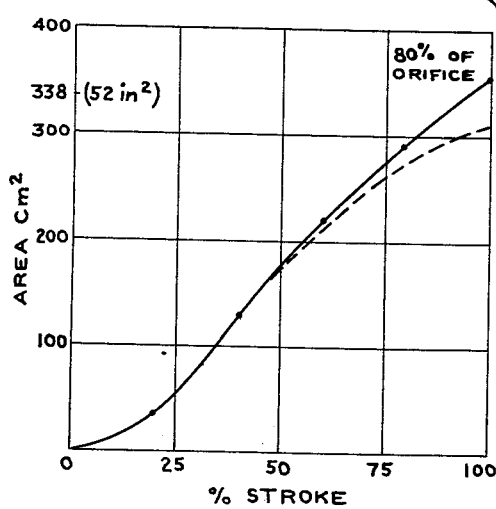
FIG. 9
ALBERT G. MUMMA
INVENTOR.
BY Daniel H. Bobis
ATTY

# United States Patent Office 3,494,589
Patented Feb. 10, 1970

3,494,589
ROTARY VALVE WITH INCREASED FLOW AREA
Albert G. Mumma, Short Hills, N.J., assignor to Worthington Corporation, Harrison, N.J., a corporation of Delaware
Filed July 31, 1968, Ser. No. 749,062
Int. Cl. F16k *1/16, 31/12*
U.S. Cl. 251—298                                      5 Claims

ABSTRACT OF THE DISCLOSURE

A valve member having a plurality of face portions combined to provide a control surface in a rotary control valve wherein the valve member is eccentrically rotatable. The valve member is of unitary construction and the control surface thereof includes an annular portion of a spherical face which engages a port seat face to provide a metal-to-metal seal when the valve is closed, and a central recess providing a spaced face to face relationship between a portion of the port seat face and the overlying portion of the control surface when the valve is open.

---

This invention relates generally to rotary type control valves for controlling flows through fluid transport systems or conduits, and more particularly to rotary valve members therefor.

The present invention is an improvement to rotary type valves of the copending U.S. application Ser. No. 703,318, filed Feb. 6, 1968 of inventor H. D. Baumann and assigned to the same assignee as the present application.

A novel valve in accordane with the copending application embodies a valve member of unitary construction having a spherical face which may have a flat portion. The valve member eccentrically rotates the spherical face into and out of engagement with an annular port seat and thereby provides a metal-to-metal seal when the valve is fully closed.

It should be appreciated that a valve member which is rotatable at one end with a valve head of the type disclosed at the other end presents a large mass to be moved. In addition, the head in this type of a valve never fully leaves the flow path of the fluid. The valve head portion overlying a portion of the controlled port forms with the end portion of the port that it overlies a restriction in the flow path.

Accordingly, an object of the present invention is to provide a rotary control valve of the type heretofore discussed having an eccentrically rotatable valve member with a flow control surface formed to reduce flow restrictions created by the valve head overlying a portion of the controlled port.

Another object of the present invention is to provide the foregoing control valve in which the valve member rotates at one end and has a head at its other end which is formed to reduce its mass and facilitate valve operation.

Another object of the present invention is to provide the foregoing valve in which the instantaneous face-to-face space between the control face and the controlled port is increased when the valve is moved from its closed to full open position.

The present invention contemplates a rotary valve having a valve chamber with a port to be controlled, an annular seat encircling said port, a valve member having a head portion at one end and a central axis extending through said head portion, means for supporting and rotating said valve member about an axis at its other end which is transverse to and offset from said central axis to rotate said head portion eccentrically relative to said port, said head having a control surface formed by a spherical face movable into and out of engagement with said port seat and fully seating thereon to block flow through said port when the valve is closed, and said spherical face having a central recess therein spacing said control surface from said port seat when said valve is open to permit fluid to flow through said port.

Further objects and advantages of the invention will become apparent from a study of the following specification taken in connection with the accompanying drawings wherein, FIGURES 1 and 2 are end and side elevations of a valve assembly embodying the present invention.

FIGURE 7 is a further enlarged sectional view of the controlled valve port and the valve member partly shown in elevation.

FIGURE 8 is a front view of the valve port and the valve member of FIGURE 7.

FIGURE 9 is a flow chart.

Figures 1, 2:
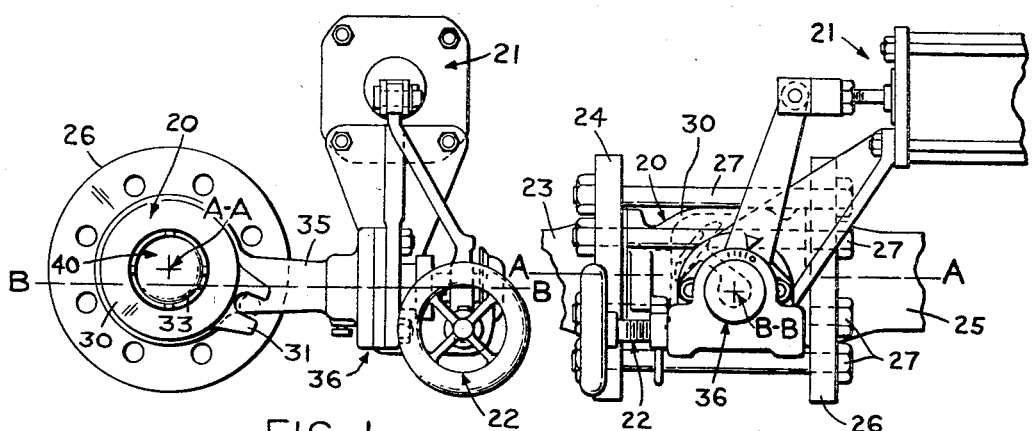

Referring now to the drawings and particularly to FIGURES 1 and 2, a rotary valve or valve assembly 20 embodying the present invention is provided with power operating means 21 and manual operating or override means 22 which can be connected as a single unit between two sections 23 and 25 of a fluid transport system or conduit. The conduit or pipe sections 23 and 25 have respective end flanges 24 and 26 which are connected together across the valve 20 in the usual manner with a plurality of tie rods 27 bolted at their ends. Usual seal means (not shown) are provided between the ends of a valve housing 30 of the valve assembly 20 and the flanged ends 24 and 26 of the pipe or conduit sections 23 and 25, respectively. The valve housing 30 preferably has a slotted portion or bifurcation 31 for engaging one of the tie rods 27 to prevent rotation of the valve assembly 20 relative to the conduit portions 23 and 25.

Figures 3, 4:
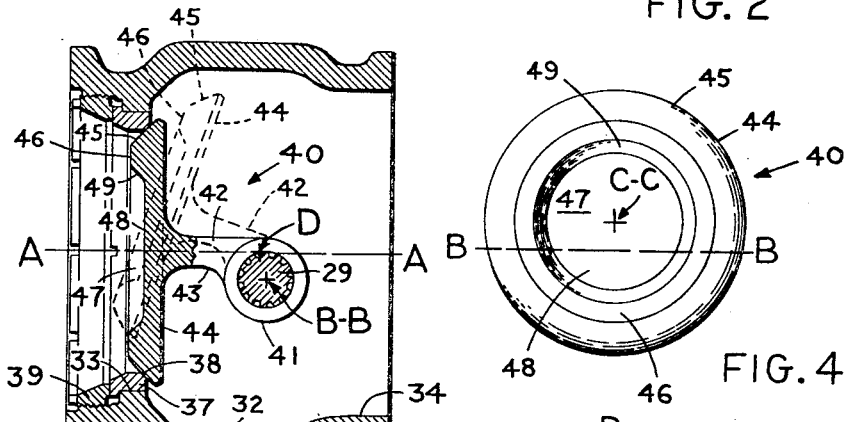
FIGURE 3 is an enlarged sectional view of the novel valve assembly taken on line 3—3 of FIGURE 1.
FIGURES 4, 5 and 6 are front, side and top views, respectively, of a valve member made in accordance with the present invention.

Now referring also to FIGURE 3, the valve housing 30 defines a chamber 32 therein which is provided with openings or ports 33 and 34 at its respective ends to form the requisite flow connections between the defined valve chamber and the conduit portions 23 and 25, respectively. A tubular arm 35 is cantilevered from one side of the valve housing 30 on an axis B—B which is disposed laterally across or transverse to a longitudinal or flow axis A—A through the valve chamber 32. Suitable means 36 is provided at the free end of the tubular arm 35 for mounting the operating means 21 and 22 on the valve housing 30.

A shaft 29 is suitably journalled in the arm 35 and in a suitable socket means (not shown) which is provided in the formed valve chamber 32 on the opposite end therefrom the arm 35 and axially aligned therewith on the lateral or transverse axis B—B. The shaft is rotatable, therefore, on the axis B—B and extends through the tubular arm 35, which is suitably packed or sealed against fluid leakage, and is appropriately connected at its exposed end for automatic power and/or manual operation by the operating means 21 and 22.

As shown in FIGURES 3 and 7, valving or flow control in this instance is accomplished at the end opening or port 33 which is step bored and tapped. An annular seat or port seat 37 with an external shoulder is positioned in the stepped bore and is retained therein by a ring nut 39. The inner annular edge of the port seat 37 preferably is suitably machined to provide a circular seat face 38 the center of which is located on the longitudinal or flow axis A—A and, in this instance, is substantially coincident or flush with the adjacent wall surface of the valve chamber 32. The valve housing 30 preferably of a unitary construction so the end opening or port 34 is made sufficiently large to permit insertion and removal of a valve member 40.

Figures 5, 6:
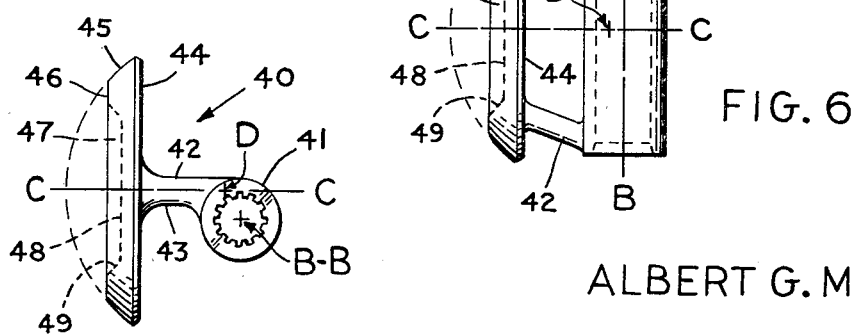

The valve member 40, also shown in FIGURES 4, 5 and 6, has a central axis C—C and is of a unitary construction being provided at one end with a tubular mounting portion 41 which is splined or otherwise suitably connected to the shaft 29 for rotation thereby. A pair of converging arms 42 extend from the ends of the mounting portion 41 to a circular valve head or head portion 44 providing a substantially rigid spherical face 45 at the other end of the valve member 40. The arms 42 are tapered or otherwise suitably formed to provide reduced portions 43 adjacent the head portion 44 which are capable of being flexed or deformed and, thereby, provide a limited amount of angular displacement or cocking of the head portion to insure complete seating of the spherical face 45 with the seat face 38 of the port seat 38.

The central portion of the spherical face 45 is removed thereby providing a flat surface or face portion 46 normal to the central axis C—C which is nulled out or has a central recess 47 formed therein. The recess 47 is provided with a substantially flat base or bottom surface 48 which is encircled by a preferably flared annular wall surface or face 49. As shown, the spherical face 45, flat face 46 and flared wall surface 49 are annuli substantially concentric on the central axis C—C which encircle the bottom surface 48 of the central recess 47.

In effect, the resulting valve head 44 can be considered as being a slice of a sphere having the form of a disc defined by an annular portion of a spherical surface and a pair of substantially parallel flat surfaces. The circular flat surfaces are of unequal diameters and the surface having the smaller diameter is provided with a central recess.

As best shown in FIGURES 3, 7 and 8, the annular spherical face 45, flat face 46 and wall surface or face 49 combine with the bottom surface 48 of the recess 47 to form a control surface on the head portion 44 which cooperates with the seat face 38 of the port seat 37 to control fluid flow through the port 33 as the valve member 40 opens or closes. Instead of there being a fully spherical valve face extending progressively further into the port 33 when closed from the annular intersection of the spherical face with the seat face 38 to the point thereof on the axis C—C, the valve head portion 44, made in accordance with the present invention, has a formed control face or surface which extends forwardly only a limited amount which is the axial distance between the annular intersections of the spherical face 45 with the seat face 38 and the flat face portion 46. The formed control surface or face extends rearwardly or receeds at its center along the annular wall 49.

As disclosed in the aforementioned copending application, Ser. No. 703,318, the valve member 40, which has a central axis C—C through the head 44, rotates on the lateral or transverse axis B—B which is offset from the central axis and the flow axis A—A in the direction of closing movement of the valve member. The center D of the spherical face 45 is located on the central axis C—C as shown. To facilitate the description of flow control which follows, the valve head 44 is indicated in FIGURES 7 and 8 as being 44A, 44C and 44B when the valve member 40 is in its closed position, its full open position and a position intermediate therebetween, respectively.

As the valve member 40 rotates (counterclockwise in FIGURE 7) to its closed position, one portion of the spherical face 45 which is normally leading in the direction of such movement will first engage an adjacent portion of the seat face 38 of the port seat 37. Further closing rotative force transmitted from the operating means 21 to the valve member 40 by the shaft 29 causes the valve head 44 to cock or move about the initial point of contact and permit the spherical face 45 to completely seat on the seat face 38. Such cock is accomplished by deflection or distortion at the reduced portions 43 of the arms 42.

With the valve member 40 in its fully closed position with the valve head indicated as 44A, the central axis C—C is substantially coincident with the flow axis A—A. When the valve member 40 moves to fully open the port 33 (clockwise in FIGURE 7), the indicated valve head 44A will move progressively to its positions as indicated as 44B, then 44C. Such opening movement causes the lower portion or closing side of the head 44 to move progressively away from the corresponding portion of the port seat 37 thereby providing a continuously increasing opening of the port 33 therebetween.

If the flow control surface or face of the head 44 was fully spherical as indicated by dotted lines in FIGURES 5 and 6, the only opening for flow in the upper portion or on the opening side of the flow path would be realized only from the axial component of movement of the valve member 40 which is derived from the offset of the lateral axis B—B from the axes A—A and C—C. This limited or restricted opening is eliminated by providing the flat face 46 with the central recess 47. The valve head 44 also never moves out of the upper portion or the opening side of the flow path even when it assumes its full open position 44C. Thus, the formed control surface or face of the valve head 44 also reduces the flow restricting effects of the head being always disposed in the flow path.

Accordingly, the effects of limited opening due to the axial component of movement of the novel valve member 40 is restricted to the initial movement from or the terminal movement to the valve head position 44A. As the valve member 40 further moves toward its full open position, the annular flat face 46, wall surface 49 and the bottom recess surface 48 progressively move into spaced face to face alignment with the upper portion of the port seat to define a flow path opening therebetween, best shown in FIGURES 7 and 8.

While providing a central flat face on a spherical valve member in itself is not new as is shown in the aforementioned copending application, Ser. No. 703,318, the novel concept of providing such a flat with a central recess as herein disclosed affords a valve of this type, made in accordance with the present invention, with a substantially constant flow rate change per unit of movement for virtually the complete stroke of the valve member as is shown by the solid line curve of FIGURE 9. The dotted line curve of FIGURE 9 is indicative of a similar valve when the valve member has a spherical face with only a flat and clearly illustrates the fall off of the flow rate change realized with this valve. While a third curve could be shown for a valve with a fully spherical face which probably make a dramatic showing, this curve would merely indicate a severely depressed flow rate change for substantailly the full valve member stroke.

What is claimed is:

1. In a rotary valve having a valve chamber with a port to be controlled and an annular port seat providing a seat face encircling the end of said port, the combination comprising:
   a valve member of unitary construction having a head portion at one end thereof and a central axis extending through said head portion;
   means for supporting and rotating said valve member about an axis at its other end which is transverse to and offset from said central axis to rotate said head portion eccentrically relative to said port;
   said head portion having a formed control surface providing a spherical face portion movable into and out of engagement with said port seat and completely engaging said seat face to form a seal thereby for blocking flow through said port when said valve is closed; and said formed control surface having a central recess therein providing a spaced face to face relationship between the seat face and said control surface overlying said seat face when said valve is open.

2. The rotary control valve in accordance with claim 1 wherein said recess has a substantially flat bottom surface and a flared annular wall surface extending therefrom.

3. The rotary control valve in accordance with claim 1 wherein said control surface further includes a flat annular face normal to and concentric with said spherical face portion about the central axis.

4. The rotary control valve in accordance with claim 3 wherein said recess has a bottom surface and an annular wall surface extending therefrom and concentric with said flat and spherical faces.

5. The rotary control valve in accordance with claim 4 wherein said bottom surface is substantially flat and normal to said central axis, and said annular wall surface is flared.

References Cited

UNITED STATES PATENTS 2,269,382    1/1942    Schmidt.
2,573,648    10/1951    Nickerson.

FOREIGN PATENTS 614,574    12/1960    Italy.

ARNOLD ROSENTHAL, Primary Examiner

U.S. Cl. X.R.

251—58